(12) United States Patent
Perry et al.

(10) Patent No.: US 8,869,425 B2
(45) Date of Patent: Oct. 28, 2014

(54) WASTE PROCESSING

(75) Inventors: Ophneil Henry Perry, Nottingham (GB); Rifat Al Chalabi, Nottingham (GB)

(73) Assignee: Chinook End-Stage Recycling Limited, Nottingham (GB)

( * ) Notice: Subject to any disclaimer, the term of this patent is extended or adjusted under 35 U.S.C. 154(b) by 0 days.

(21) Appl. No.: 13/878,137

(22) PCT Filed: Sep. 7, 2011

(86) PCT No.: PCT/GB2011/001310
§ 371 (c)(1),
(2), (4) Date: May 3, 2013

(87) PCT Pub. No.: WO2012/059706
PCT Pub. Date: May 10, 2012

(65) Prior Publication Data
US 2014/0144043 A1  May 29, 2014

(30) Foreign Application Priority Data

Nov. 4, 2010 (GB) .................................. 1018586.6

(51) Int. Cl.
*F26B 3/02* (2006.01)
(52) U.S. Cl.
CPC ....................................... *F26B 3/02* (2013.01)
USPC ....... 34/499; 34/90; 201/39; 60/698; 110/212
(58) Field of Classification Search
USPC ......... 34/380, 381, 413, 499, 524, 58, 80, 90, 34/201, 218; 201/8, 39; 202/45; 60/618, 60/698; 110/187, 191, 212
See application file for complete search history.

(56) References Cited

U.S. PATENT DOCUMENTS

| | | | |
|---|---|---|---|
| 5,230,167 A * | 7/1993 | Lahoda et al. | 34/75 |
| 5,361,514 A * | 11/1994 | Lahoda et al. | 34/391 |
| 5,428,906 A * | 7/1995 | Lynam et al. | 34/379 |
| 5,557,873 A * | 9/1996 | Lynam et al. | 34/379 |
| 8,276,289 B2 * | 10/2012 | Causer | 34/90 |

(Continued)

FOREIGN PATENT DOCUMENTS

| AT | 395553 B | 1/1993 |
|---|---|---|
| DE | 3129638 A1 | 3/1983 |

(Continued)

OTHER PUBLICATIONS

International Search Report for PCT/GB2011/001310, issued Dec. 12, 2011.
GB Combined Search and Examination Report under Sections 17 & 18(3) dated Nov. 19, 2010.

*Primary Examiner* — Steve M Gravini
(74) *Attorney, Agent, or Firm* — Stetina Brunda Garred & Brucker

(57) ABSTRACT

An apparatus (100) for processing waste material is provided which comprises a heat proof chamber (102), a hot gas inlet (106, 112) for heating the interior of the heat proof chamber (102), and a rotatable drum (118) for containing waste to be processed. The drum (118) has gaps (120) therein, is located within the heat proof chamber (102), and separated therefrom around its edge by a gap. The apparatus (100) is also provided with a drive (126, 128) for rotating the drum (118) at a speed such that, in use, waste material that is heat softened is centrifugally separated from the remainder of the waste and passes through the gaps (120) in the drum (118).

24 Claims, 9 Drawing Sheets

(56) References Cited

U.S. PATENT DOCUMENTS

| | | | |
|---|---|---|---|
| 8,322,056 B2 * | 12/2012 | Causer | 34/90 |
| 2010/0050466 A1 * | 3/2010 | Titmas | 34/499 |
| 2014/0144043 A1 * | 5/2014 | Perry et al. | 34/499 |
| 2014/0147907 A1 * | 5/2014 | Medoff et al. | 435/252.1 |

FOREIGN PATENT DOCUMENTS

| | | | |
|---|---|---|---|
| DE | 3129638 Al | | 3/1983 |
| GB | 2470514 A | * | 11/2010 |
| JP | 51068683 A | | 6/1976 |
| WO | WO 2010004268 A1 | * | 1/2010 |

* cited by examiner

STEP-1

STEP-2

STEP-3

WASTE PROCESSING

CROSS-REFERENCE TO RELATED APPLICATIONS

The present application claims priority to International Application No. PCT/GB2011/001310 which was filed on Sep. 7, 2011, and claims priority to the Great Britain Patent Application No. 1018586.6 filed Nov. 4, 2010.

STATEMENT RE: FEDERALLY SPONSORED RESEARCH/DEVELOPMENT

Not Applicable

BACKGROUND OF THE INVENTION

The present invention relates to improvements in waste processing, in particular the invention relates to the processing of waste material containing a polymer metal mix, for example waste insulated electrical cable.

With diminishing resources and an increasing cost of oil it is becoming increasingly important that materials are recycled and not put into landfill. Furthermore it is increasingly important that waste materials are processed locally and are not, for example, shipped overseas where they can be disposed of in regimes having less harsh statutory requirements relating to pollution and the processing of waste.

When materials containing substantial quantities of metal are to be processed it is usual to separate the metal from the remainder of the waste and to clean it for re-use. However, when the metals are coated in other substances this can prove to be difficult and specialized processes are used for removing the coatings. One such process is described in WO/2004 059229 and WO/2006 100512 in the name of Al Chalabi et al, in which a de-coating method is described. While this method is effective for recovering the metal and energy is recovered from the non metal components there are several problems associated with this technology when trying to recycle material substantially comprising a low melting point plastic and metal. Firstly, as the plastic melts the waste will stick together and stick to the sides of the oven and accordingly will not tumble through the oven as is intended to happen. Secondly the plastic is pyrolysed and is not recovered from the process. Accordingly, although energy is recovered from the plastic component of the waste it cannot be reused.

Currently, where it is desirable for the plastic to be recycled from the waste the waste is shipped to countries having a low labor cost and the plastic is manually separated from the metal, for example the insulation is manually stripped from copper wire. In this manner both the plastic and the metal can be sold on to be recycled into new products. While this method is effective it is not financially viable for manual separation in many countries as the cost of labor is too high in comparison to the value of the plastics recovered.

It is the purpose of the present invention to provide an improved waste processing system that at least in part mitigates the above mentioned problems.

SUMMARY OF THE INVENTION

According to a first aspect of the invention there is provided a method of processing waste matter containing heat softening material, the method comprising: providing a waste processing apparatus having rotating drum having gaps therein; placing the waste material in said rotating drum; passing hot gasses containing substantially no oxygen through the apparatus so as to heat the material therein to a temperature sufficient to heat soften the heat softening material contained therein but not sufficient to pyrolyse the waste material; and rotating the drum so as to cause the heat softened material to centrifugally separate from the remainder of the waste by passing through the gaps in the drum.

In this manner, as the plastic starts to melt and becomes flowable it is physically separated from the metal thereby allowing both the metal and the plastic components to be recovered for re-use without the need for labor intensive processes.

Preferably the method further comprises collecting the heat softened material within the apparatus in a collection pan beneath the rotating drum.

The method may include providing a retention means within the drum and retaining the material to be treated between the retention means and the interior of the rotating drum.

The method preferably further comprises solidifying the material collected in the collection pan.

Preferably the hot gas is passed from an interior of the drum to an exterior of the drum through the waste material.

Preferably, once the heat softening material has been substantially separated from the remainder of the waste, the method further comprises increasing the temperature within the drum by passing hot gasses substantially devoid of oxygen through said chamber so as to pyrolyse any organic matter within the remaining waste. Preferably the separated heat softening material is maintained within the apparatus at a temperature below its pyrolysis temperature In a preferred embodiment the method comprises passing hot air into a chamber containing the rotating drum so that it passes over the material therein and exits via an elongate slot extending along the length of the chamber so as to remove any dust or dirt form the exterior of the cables. The hot gas may have water injected into is so that the water assists in cleaning the exterior of the material in the chamber. Once the plastic has substantially been cleaned a valve downstream of the elongate slot is closed so as to prevent further gas flow therethrough and a valve downstream of a main chamber outlet, situated substantially coaxially with the chamber in the bottom thereof is opened.

In a preferred method placing the waste material in a rotating drum having gaps therein comprises placing the waste material in a waste processing cartridge comprising: the drum; a retaining means adjacent to and separated from the interior of the drum such that a space is defined between the retaining means and the drum for receiving the waste; a chamber liner surrounding and separated from the drum; and a collection pan removeably attached to the chamber liner underneath the rotating drum; and placing the waste processing cartridge in said apparatus.

The method may further comprise the step of, after separating said heat softening material from said waste, removing said cartridge said apparatus.

The method preferably comprises allowing the heat softening material to cool so as to solidify; separating the collection pan from the chamber liner; and removing the solidified heat softening material from the collection pan.

In a preferred method the waste material comprises metal cables insulated with a polymer material and the method substantially separates the polymer material from the metal.

In one preferred method said apparatus has an inlet, a first outlet coaxial to the drum an located at one end thereof, and a second outlet in the side of said apparatus, the method may further comprise: opening a flow path through said inlet and said second outlet for the passage of hot gas to clean the material therein; closing the flow path through said inlet and said second outlet and opening a flow path through said inlet and said first outlet to process said waste. The method may further comprise adding water and/or surfactants to said hot gas when said hot gasses are flowing through said flow path between said inlet and said second outlet.

Preferably, once the heat softening material has been substantially separated from the remainder of the waste, the method includes the steps of: closing the flow path through the inlet and the first outlet and opening the flow path between the inlet and the second outlet; and increasing the temperature within the chamber by passing hot gasses substantially devoid of oxygen through said flow path between the inlet and the second outlet so as to pyrolyse any organic matter within the remaining waste.

The method may further comprise providing an apparatus for pyrolysing material containing organic matter said apparatus having a heated chamber in which said waste is heated and a treatment chamber connected to said heated chamber by feed and return conduits; pyrolysing material within said heated chamber to produce syngas, circulating said syngas through said treatment chamber; treating said circulated gas in said treatment chamber by heating it in a substantially oxygen free environment; recycling at least part of said syngas through the heated chamber; and passing at least a some of said syngas through said waste processing apparatus to heat said heat softening material therein. The method may further comprise providing a flow path between an outlet of the waste processing apparatus and the treatment chamber and passing said gasses exiting said waste processing apparatus into said treatment chamber.

According to a second aspect of the invention there is provided an apparatus for carrying out the method of the first aspect of the invention, the apparatus comprising: a heat proof chamber; an inlet for receiving hot gas and a first outlet for exhausting hot gas; a rotatable drum for containing waste to be processed, said drum having gaps therein and being located within the heat proof chamber and separated therefrom around its edge by a gap; and a means for rotating the drum at a speed such that, in use, waste material that is heat softened is centrifugally separated from the remainder of the waste and passes through the gaps in the drum.

In this manner, as the plastic starts to melt and becomes flowable it is physically separated from the metal thereby allowing both the metal and the plastic components to be recovered for re-use without the need for labor intensive processes.

Preferably the apparatus further comprises a retaining means, adjacent to and separated from the interior of the drum such that a space is defined between the retaining means and the drum for receiving the waste. In this manner, irrespective of the orientation of the drum, when it is being loaded with waste material this waste material can be distributed around the interior of the drum and retained In place there during processing. In one preferred use the retaining means is separable. This enables the retaining means to be used to load the waste material, for example when being used for separating insulation from metal cable cables the insulated cables can be wound around the retaining means prior to it being inserted in the cage.

In a preferred arrangement the apparatus may further comprise a chamber liner located adjacent the side walls of the heat proof chamber. The liner prevents the molten plastic from coming into contact with the walls of the chamber and may, for example, be constructed of steel.

Preferably the inlet comprises an inlet conduit centrally located within the drum, the inlet conduit having a plurality of outlet holes therein about its circumference. The hot gas can enter the drum through the conduit and is distributed internally within the drum around the circumference of the inlet conduit to effect even heating.

In a preferred embodiment the apparatus includes a collection pan located at the lower end of the heat proof chamber for, in use, collecting the heat softened material separated from the waste. The collection pan may be in the shape of an open topped annulus. Where the means of heating the chamber comprises an inlet for receiving hot gas and an outlet for exhausting hot gas, the outlet preferably passes through the centre of the annulus. The collection pan may be removably attachable to the chamber liner.

Preferably the means of rotating the drum comprises an electric motor located externally of the heat proof chamber and having a drive shaft passing through the heat proof container from the outside to the inside.

In one embodiment the chamber has an opening along one side thereof for providing a second, alternative, outlet for the hot gas and valve means for selectively opening a flow path through either the first outlet and/or through the second outlet. Preferably the opening is elongate. The liner may also have a slit that extends along its length and which aligns with an elongate outlet in the side of the chamber giving an alternative exit route for the hot gas.

In a preferred embodiment the apparatus comprises the retaining means, adjacent to and separated from the interior of the drum such that a space is defined between the retaining means and the drum for receiving the waste; the chamber liner located adjacent the side walls of the heat proof chamber; and the collection pan located at the lower end of the heat proof chamber for, in use, collecting the heat softened material separated from the waste; and the rotatable drum, the retaining means, the chamber liner, and the collection pan form a waste processing cartridge, the waste processing cartridge removable from the heat proof chamber as a single unit.

BRIEF DESCRIPTION OF THE DRAWINGS

Embodiments of the invention will now be described, by way of example, in relation to the drawings in which.

DETAILED DESCRIPTION OF THE INVENTION

Figure 1:
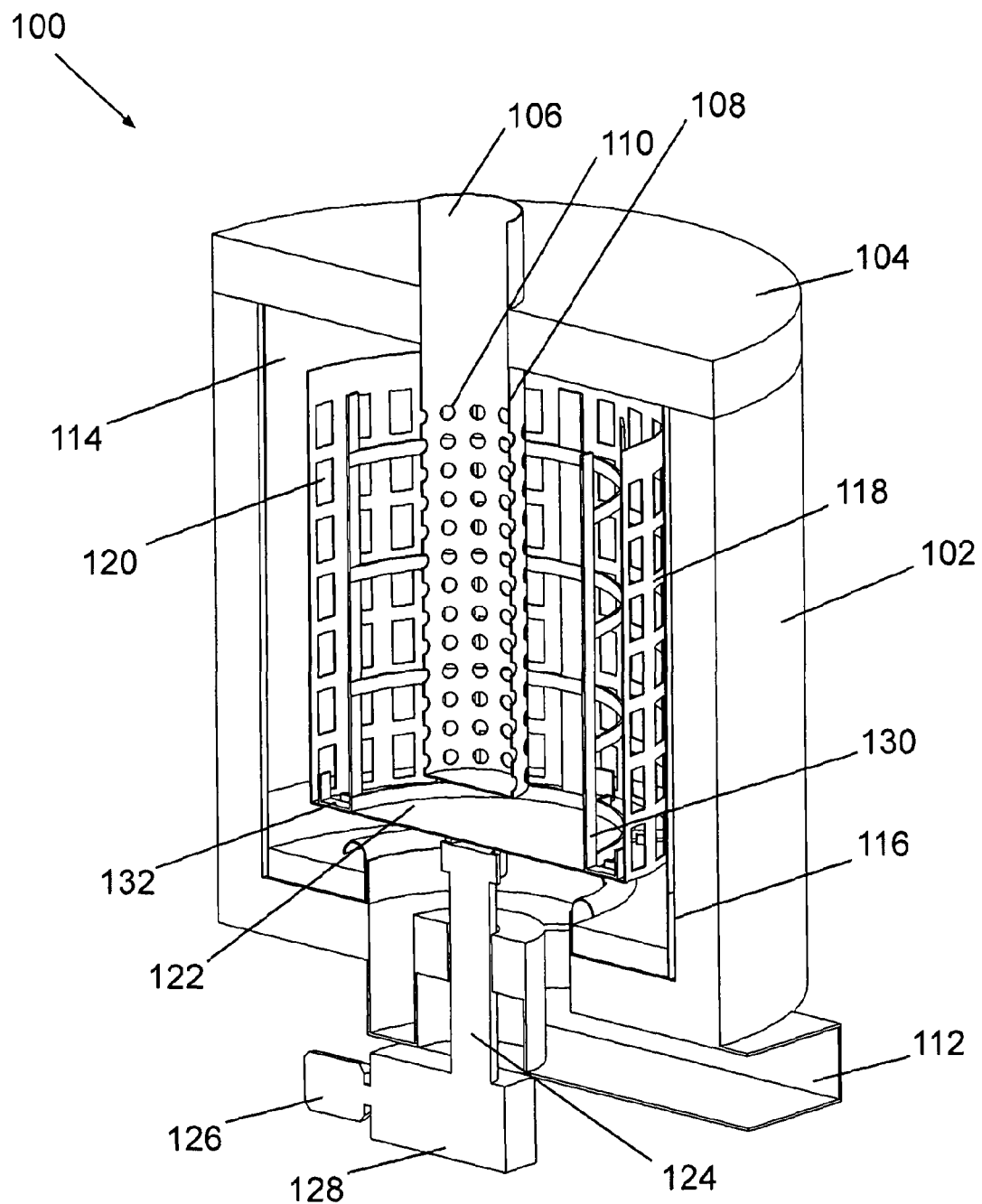
FIG. 1 is a cross section of an orthogonal view of an apparatus in accordance with the invention.
Figure 2:
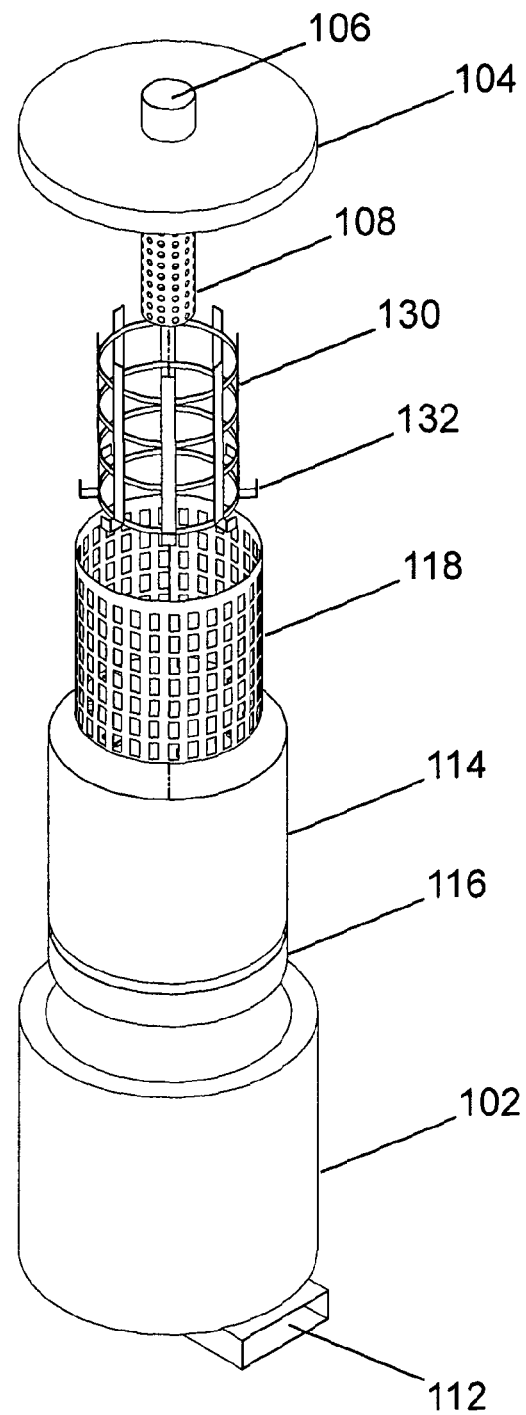
FIG. 2 is an exploded view of an apparatus in accordance with the invention.

Referring to FIGS. 1 and 2 an apparatus 100 for processing waste material is shown. The apparatus comprises a heat proof chamber 102 having a lid 104, the chamber and lid defining an interior space in which the waste can be processed. The chamber is preferably of a refractory lined material, although other materials capable of withstanding the process temperatures may of course be used. Located in the lid 104 is an inlet 106 for receiving hot gasses which are used to heat the interior of the chamber. A substantially tubular inlet conduit 108 extends from the inlet into the interior of the chamber 102 substantially along its central axis. The conduit 108 has a closed end and a plurality of perforations 110 in its sides evenly spaced about its circumference.

An outlet 112 is located at the bottom of the chamber through which hot gasses can exit the apparatus 100. The outlet exits the chamber 102 substantially about its central axis. Located within the chamber is a chamber liner 114 which is adjacent to the side walls of the chamber 102 lining the sides thereof. Located at the bottom of the chamber between the outlet and the side walls is a collection pan 116 that is removeably attached to the chamber liner 114. The collection pan is substantially annular in shape and has an inner surface the upper edge of which curves towards the pan, i.e. away from the annular opening in the centre of the pan 116.

Located within the chamber, and aligned on its central axis is a rotating drum 118 that has a plurality of perforations 120 therein. The drum 118 has a bottom surface 122 by which it is attached to a shaft that passes through the bottom of the chamber 102 and is driven by a motor 126 via a gearbox 128. As the drum is rotated, the vertical orientation provides the most mechanically sound bearing orientation for the axis of rotation as there are no static bending loads on the shaft or bearing.

Inside the drum 118 is a retainer 130 that is coaxial with the drum 118 and defines a waste holding space between the drum 118 and the retainer 130. The retainer has spacers 132 to hold it in spaced relationship from the drum 118. Although only shown at the bottom it will be appreciated that similar spaces (not shown) may also be located at the top of the retainer 130.

As can be seen the inlet conduit 108 extends into the centre of the drum 118. The shaft 124 passes through the centre of the collection pan 116 and maintains the drum 118 in spaced relationship from the collection pan 116. Hot gas passing from the inlet 106 to the outlet 112 enters the chamber 102 in its centre and the hot gasses then flow outwards through the waste material that is being processed, between the base of the drum and the collection pan 116 and through the central opening in the base of the chamber to the outlet 112. As both the inlet 106 and outlet 112 are located on the central axis of the processing chamber a substantially even flow through the chamber will be effected resulting in even heating of the waste therein without the formation of hotspots. The rotation of the drum by the motor contributes to the even heating as, in the even that hotspots of concentrated air flow are experienced, passing rotating the drum prevents these hotspots heating a single are of the waste.

With specific reference to FIG. 2, as can be seen, with the lid 104 removed the drum 118, liner 114, collection pan 116 and retainer 130 can all be removed from the chamber 102. Although shown as an exploded image it will be appreciated that these parts may be removed as a single unitary item, i.e. the liner 114 with the collection pan 116 attached thereto with the drum and retainer may be removed together as a cartridge 117. In this way a fast change over between processing cycles can be achieved as one cartridge is being processed another can be unloaded or cooled whilst another is being prepared for processing. This method minimises downtime between cycles and improves overall efficiency of the system.

Figure 3:
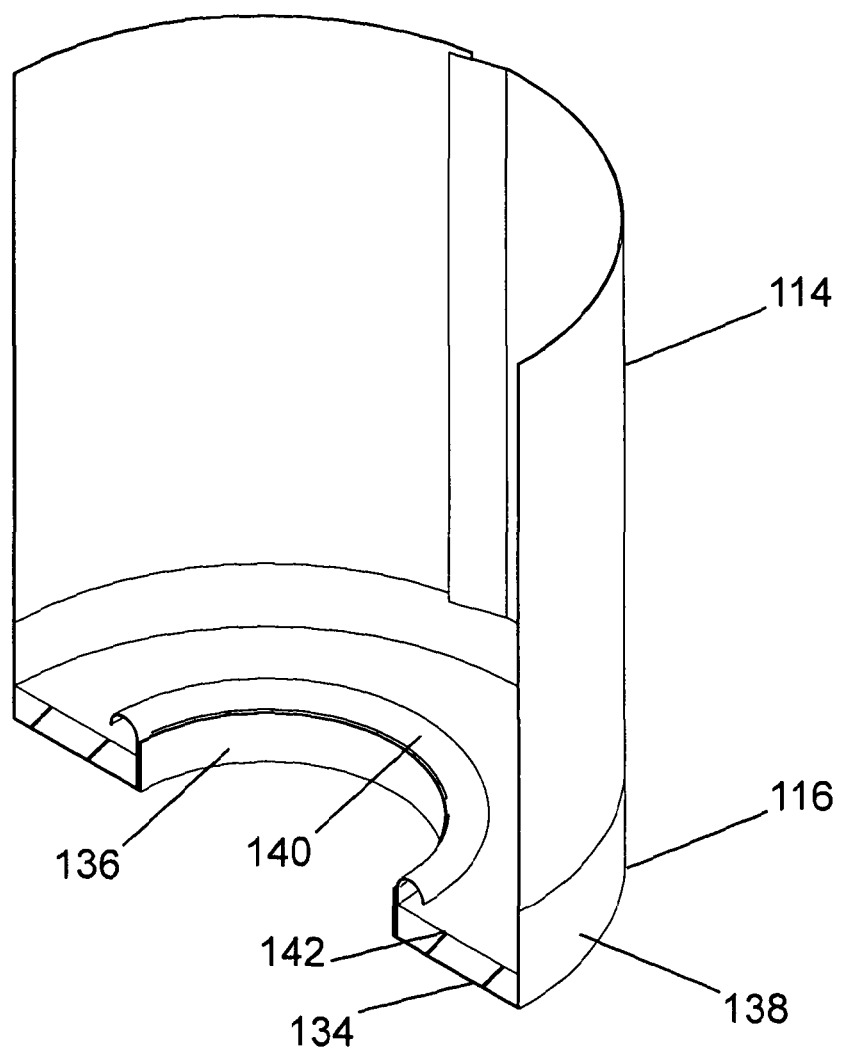
FIG. 3 is a cross section of an orthogonal view of a chamber liner and collection pan for use in the apparatus in accordance with the invention.

Detail of the liner 114 and collection pan 116 is shown in greater detail in FIG. 3. The liner 114 substantially comprises a tubular piece of metal that in use lines the interior of the container and the collection pan comprises a U shaped annulus having a bottom surface 134 and upright inner 136 and outer annular 138 surfaces defining the collection space therebetween for collecting plastic 142 or other heat softening material. The inner surface 136 has an inwardly curving lip 140 at its upper edge which defines the edge of a gas flow path. The curved lip 140 assists in reducing turbulence in the gas flowing out of the outlet and assists in preventing molten plastic from being entrained into the gas flow from the collection space.

The collection pan 116 is removeably connected to the liner 114 by means of a simple push fit. In use, as the drum rotates the heat softened material separates from the waste being processed and flows down the liner walls to gather in the collection pan 116.

Figure 4:
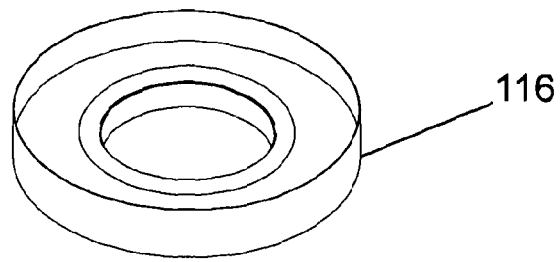
FIG. 4 shows the steps by which solidified heat softenable material is removed from the collection pan according to the invention.
Figure 4:
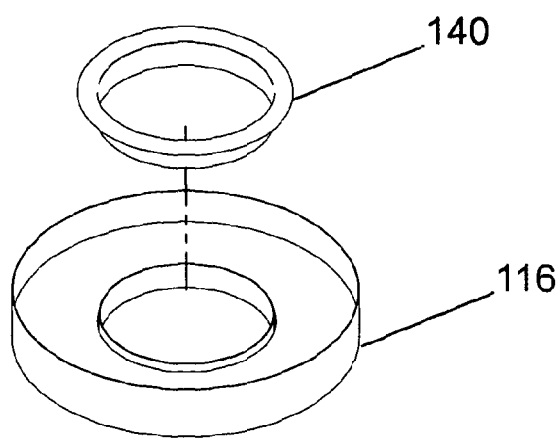
Figure 4:
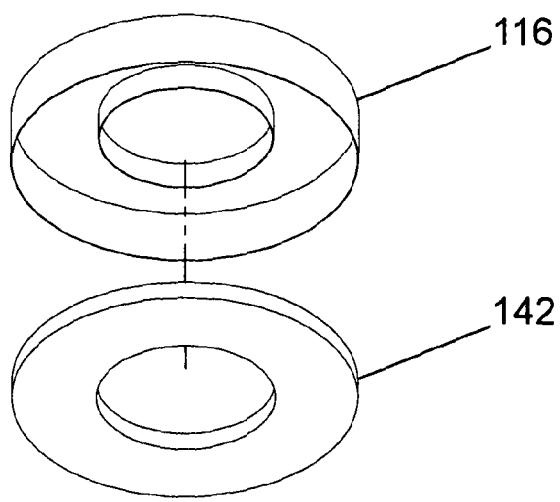

As shown in FIG. 4, once the material has been processed the liner 114 and collection pan 116 are removed from the container (for example as part of a treatment cartridge, and can then be processed for re-use. First the collection pan 116 is separated from the liner 114 (Step 1). To remove the plastic billet it is first allowed to harden sufficiently to be handled and then the lip 140 is removed from the pan (Step 2) and the pan 116 is then inverted to remove the plastic billet 142 located therein (Step 3).

Figure 5:
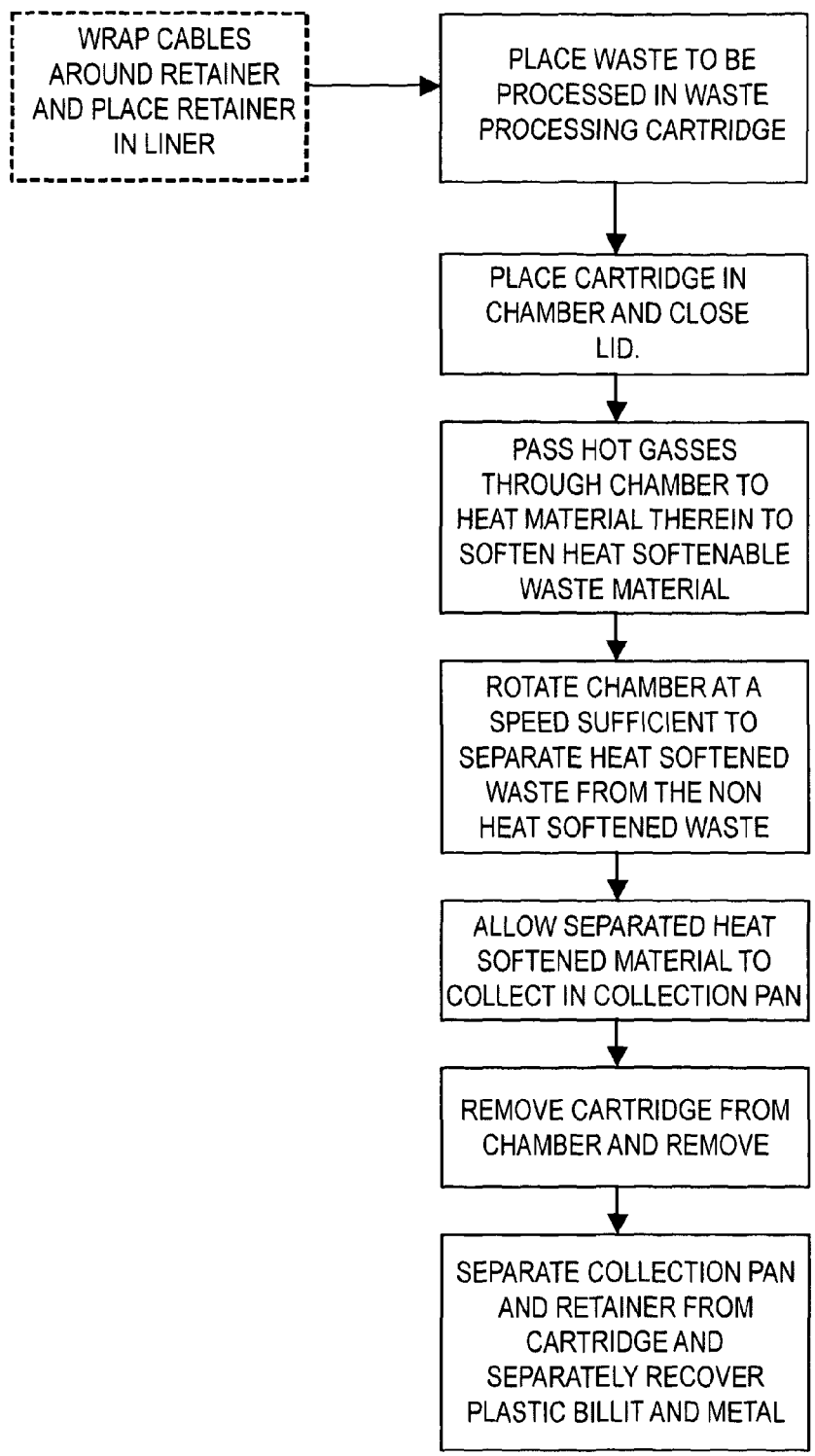
FIG. 5 shows a flow chart of the method according to the invention.

As shown in FIG. 5, in use the material to be processed is placed in the waste processing cartridge 117, between the retainer 130 and the drum 118. Where the apparatus is being used to process insulated electrical cable the cable may be wound around the retainer 130 and then the retainer and cable are positioned inside the drum 118.

The cartridge 117, once loaded, is then placed in the chamber 102 and the lid 104 is attached. Preferably a seal is formed between the cartridge and the lid to prevent the leaking of any gasses or fumes from the chamber. Hot gases are then passed in the inlet 106 and out of the outlet 112 so that a flow of hot air is established through the chamber and over the waste to be processed. As the gas flows from the interior to the exterior of the drum it must pass by, and in close proximity to the material being processed and thereby also cause that to become heated. The gas has a reduced oxygen concentration (compared to free air) and is preferably substantially devoid of oxygen so as to prevent oxidation of the materials being processed. The gas is at an elevated temperature but below the temperature at which the plastic material would pyrolyse.

The drum 118 is rotated as the gasses are passed therethrough.

The rotation has two effects, the first effect is that as the chamber 102 is rotated the material is moved about the container and becomes evenly heated, compensating for any possible cool or hot spots caused by local variance in flow pattern within the chamber 102.

The second effect of the rotation is that a centrifugal force is applied to the material being processed. As the material becomes heated the heat softenable part will soften and become flowable. The centrifugal force created by the rotation of the drum 118 exerts an outward force on the softened material causing it to move towards the outside of the drum 118. Once the softened material reaches the outside of the drum 118 it becomes separated therefrom along a radial path and will come into contact with the chamber liner from where it will flow, under the influence of gravity down the liner 114 and collect in the collection pan 116 at the bottom thereof.

The speed of rotation necessary to cause the material to become centrifugally separated will, of course, depend on the diameter of the drum 118 and on the materials being processed, for example materials that become quickly flowable with a low viscosity will require a lesser centrifugal separation force (and hence drum rotation) than materials that slowly soften over a range of temperature and have a high viscosity.

Once substantially all of the heat softenable material, for example plastic, has been removed from the non-heat softenable material, for example metal, the separation is complete and the heat and rotation can be stopped and the cartridge 117 removed from the chamber 102, allowed to cool, opened and the cable and plastic removed therefrom.

The metal will, at this stage still have small remnants of the heat softenable material thereon and may need further processing to clean it. This may be done in a known way externally form the apparatus of the invention, for example as describes in WO/2004 059229 in the name of Al Chalabi et al.

Alternatively the metal may be cleaned in the same apparatus by increasing the temperature of the gas to above the pyrolysis temperature and continuing to pass it through the chamber to pyrolyse any remaining unwanted material on the metal. It will, of course, be essential that if this process is followed that the plastic collected in the collection pan 116 is maintained at a temperature below its pyrolysis temperature. This may be done by providing a deeper collection pan 116 to maintain the plastic out of the main flow path of the hot gas and/or reducing insulation surrounding the collection pan 116 so that heat loss therefrom prevents material in the collection pan 116 from becoming over heated.

Figure 6:
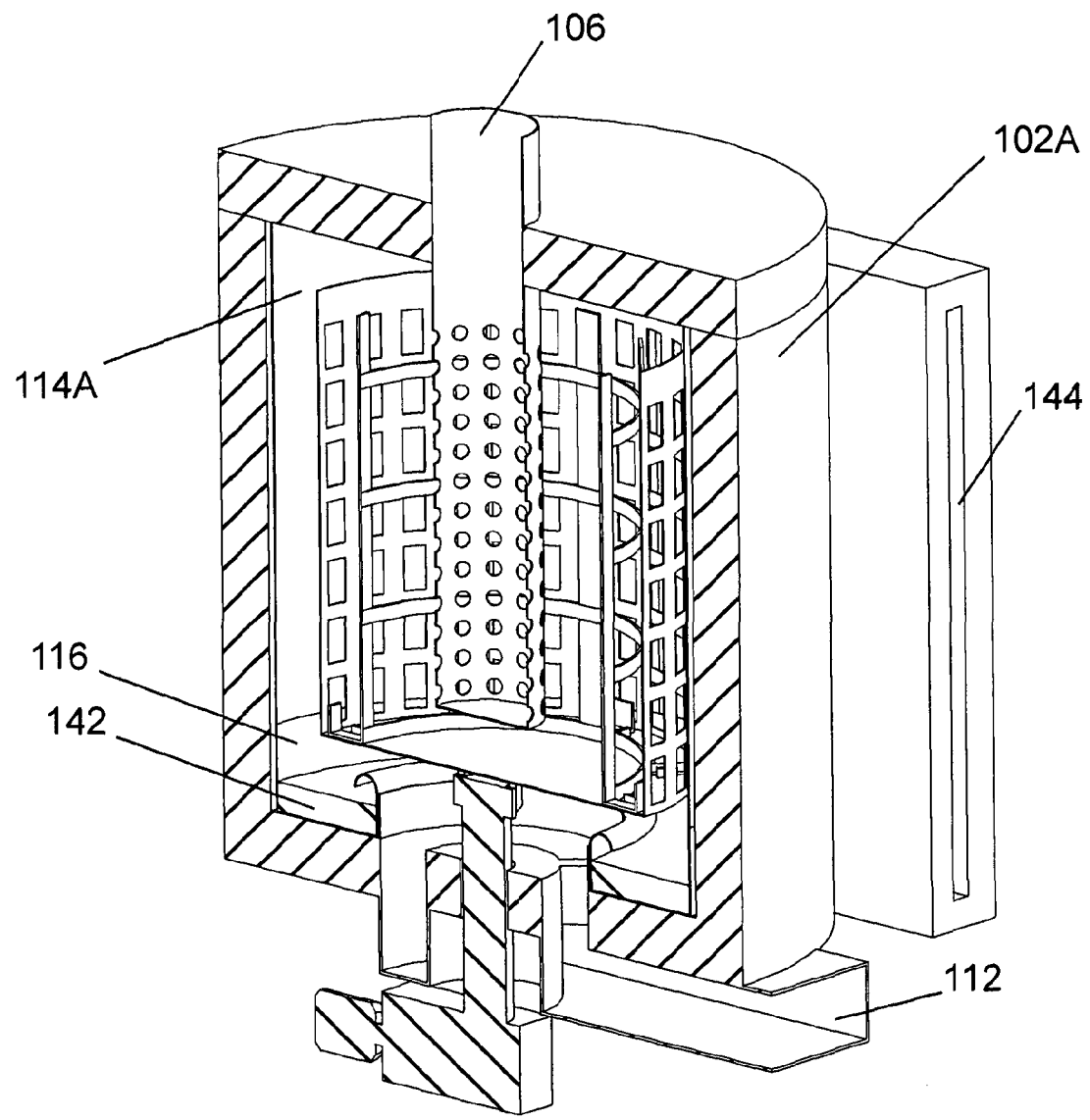
FIG. 6 shows a cross section of an orthogonal view of an alternative arrangement of the invention having a second outlet.
Figure 7:
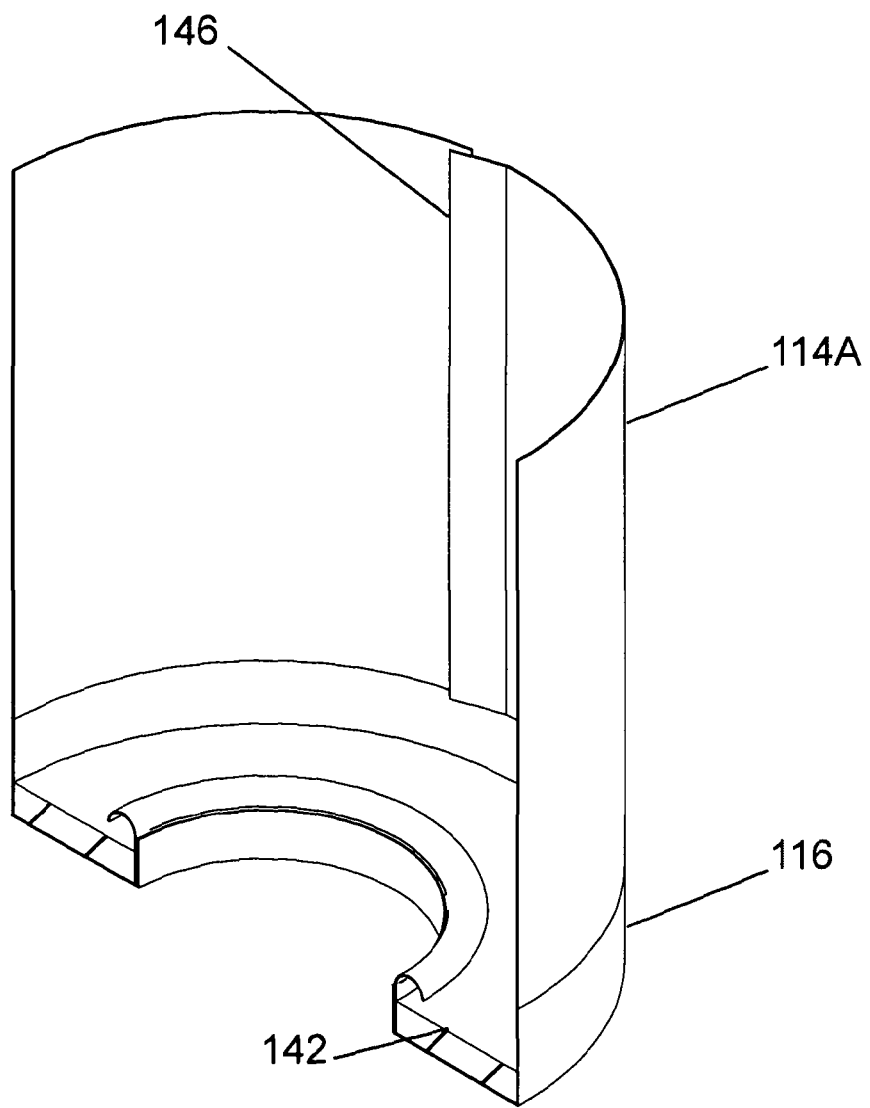
FIG. 7 shows an alternative arrangement of the chamber liner for use in the apparatus shown in FIG. 6.
Figure 8:
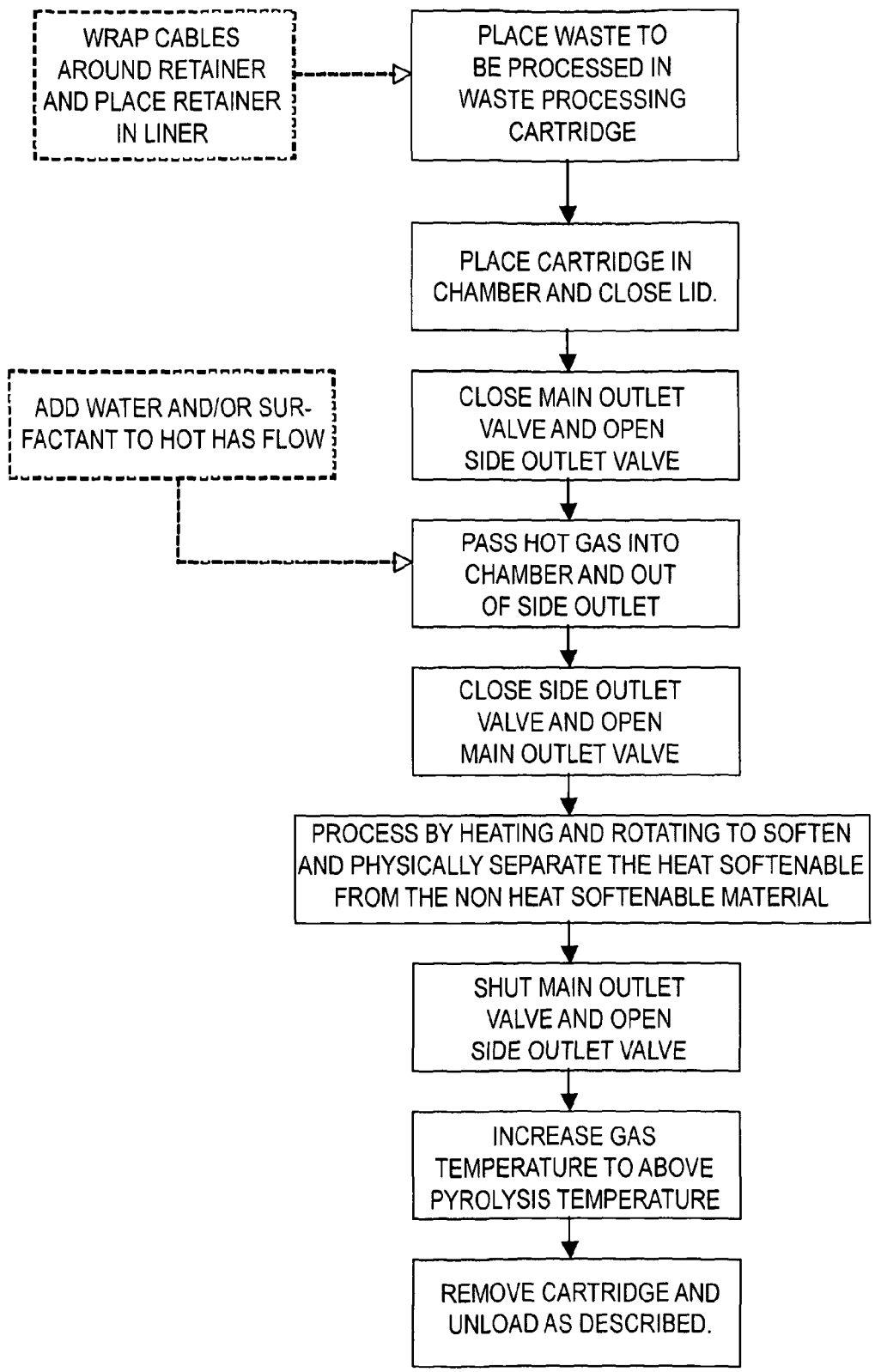
FIG. 8 shows a flow chart of a further method according to the invention.

Referring now to FIGS. 6, 7 and 8 an alternative arrangement and method of the invention is shown wherein the container 102a is provided with an elongate opening 144 along one side thereof and the liner 114a is also provided with an elongate opening 146 aligned with the opening 144. The apparatus is further provided with control valves downstream of the opening 144 and the opening 112 so as to enable a control system or operator to selectively open and close the flow paths through each opening.

In use the apparatus is loaded with waste as described above.

Once the process is started, initially the flow path through the outlet 112 is closed and the flow path through the elongate opening 144 is open so that gas flowing therethrough passes out of the outlet. As the hot gases enter through inlet 106 and pass through they will start to clean the exterior of the waste of dirt which will become entrained in the gas flow. In addition, water and/or cleaning products, for example surfactants, can be added to the gas flow to assist in the cleaning of the waste being processed. In this manner any dust or sand or any oils on the surface of the cables can be removed.

This cleaning step may be done at a gas temperature below the softening temperature of the plastic or at the process temperature such that cleaning occurs prior to the material having absorbed sufficient heat to soften.

Once the cleaning process is complete any water or surfactants being added to the hot gas is stopped and, where cleaning has been performed below process temperature, the temperature of the hot gasses may be increased.

Any dirt removed from the waste is entrained in the gas flow and removed via opening 144.

The valves are operated to close the flow path through the opening 144 and open the flow path through opening 112 so that separation of the waste may commence. In this manner, waste material separated during the process is clean material and has reduced or no contamination from the surfaces of the material therein. As the collection pan 116 operates as a trap to collect the heat softened material 142 the use of two openings prevents any entrained dirt merely collecting in the collection pan 116.

A further benefit of this arrangement is that once the heat softened materials are separated from the remainder of the waste being processed the valves (not shown) can be operated to change the flow paths such that the hot gas exits through the opening 144 and not through outlet 112. The temperature of the gas can then be increased to above the pyrolysis temperature of the heat softenable material to clean pyrolyse any residual material on the non-heat softenable part of the waste thereby cleaning it.

As the flow path through opening 144 does not pass the collection pan 116 there will be reduced heat transfer to the material collected 142 therein thereby reducing the possibility of its pyrolysation, i.e. it is isolated from the main gas flow. This may of course be used in combination with a deeper collection pan 116 and heat loss cooling described above.

Once the process is complete the separated materials are removed from the container 102a as described with reference to the first embodiment. The recovered heat softenable materials, e.g. plastics, from the cleaned waste contain a much lower contamination level and therefore are of higher value for re-use.

Figure 9:
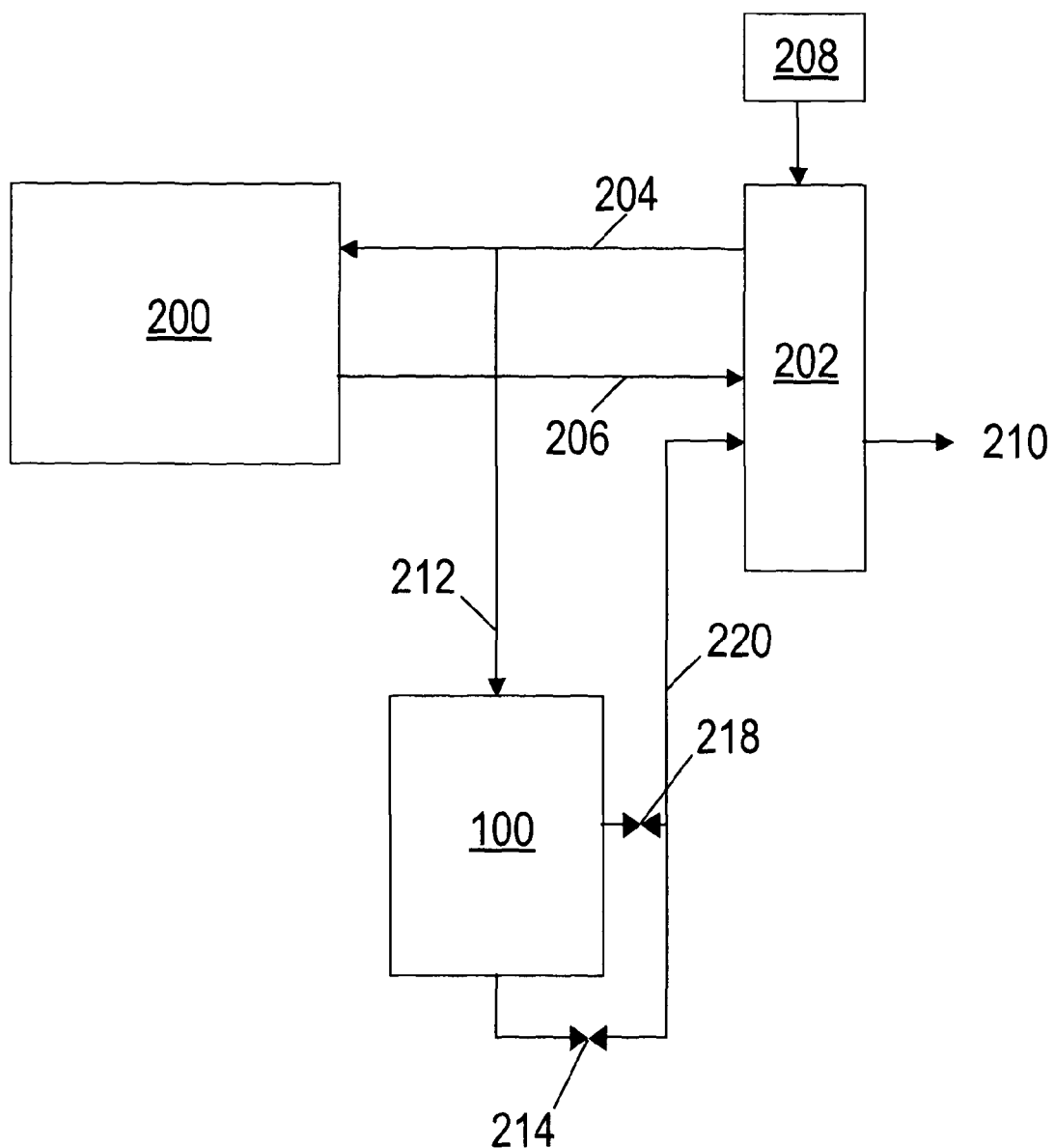
FIG. 9 shows a schematic diagram of a system for performing the method of the invention.

Referring to FIG. 9 a schematic diagram of a system for performing a method of the invention is shown. An apparatus for pyrolysing material 200 is shown which has a chamber for receiving material containing organic matter. The material is heated in the apparatus by passing hot gas through the chamber containing substantially no oxygen. The gas heats the material and causes it to pyrolyse and to produce syngas. The syngas is circulated between the apparatus 200 and a thermal treatment chamber 202 via conduits 204 and 206. In the treatment chamber 202 the gas is heated to an elevated temperature, typically in excess of 800° C. for a residence time, typically at least 2 minutes, so as to destroy any volatile organic compounds (VOC's) therein. The gas in the treatment chamber 202 is heated by means of a gas burner burning virgin fuel 208, although other means of heating may be used. The treatment chamber 202 has an outlet 210 from which the clean gas can be extracted and used, for example to produce electrical energy by known means.

A suitable apparatus for performing this is disclosed in WO/2006 100512.

A conduit 212 provides a flow of gas from the feed conduit 204 (shown) or the return conduit 206 (not shown) to the apparatus 100 to heat the material therein. A heat exchanger may be provided in the conduit 212 to reduce the temperature of the gas prior to it entering the apparatus 100 to below the pyrolysis temperature of the material therein.

An outlet conduit 220 returns the gas that has passed through the apparatus 100 to the treatment chamber 202. The apparatus is connected to the outlet conduit by valves 214 and 218 that can open a flow path through either of two apparatus outlets as described above, in particular in relation to FIGS. 6 and 8.

The combination of the rotating drum type apparatus with the pyrolysis apparatus enables the rotating drum apparatus to take benefit of the heat from the pyrolysis apparatus. The apparatus first separates the majority of the plastic from the material in the drum by softening it and then centrifugally separating it, and then the remainder of the waste is heated to a higher temperature to treat any organic matter remaining, thereby generating syngas that is fed back into the system. In this way the separation process for removing the heat softenable material for recycling required minimum energy input over its cycle as it both uses energy (in softening the material) and gives back energy, in the form of syngas from the pyrolysis stage, thereby greatly increasing the efficiency of the system.

It is further advantageous that in a single processing system material such as insulated electrical cables can be processed alongside and in combination with other materials while avoiding the problems associated with processing waste insulated cable in the apparatus of the prior art.

Although reference is made above to processing of insulated cable, any material that comprises a high percentage of heat softenable and non-heat softenable material may be processed by the method and apparatus described herein.

The invention claimed is:

1. A method of processing waste matter containing heat softening material, the method comprising:
   providing an apparatus for pyrolysing material containing organic matter said apparatus having a heated chamber in which said material containing organic matter is heated and a treatment chamber connected to said heated chamber by feed and return conduits;
   providing a waste processing apparatus having rotating drum having gaps therein
   placing the waste matter containing heat softening material in said rotating drum;
   pyrolysing said material containing organic matter within said heated chamber to produce syngas;
   circulating said syngas through said treatment chamber;
   treating said circulated gas in said treatment chamber by heating it in a substantially oxygen free environment;
   recycling at least part of said syngas through said heated chamber; and
   passing at least some of said syngas through said waste processing apparatus to heat the waste matter therein to a temperature sufficient to heat soften the heat softening material contained therein but not sufficient to pyrolyse the waste matter; and
   rotating the drum so as to cause the heat softened material to centrifugally separate from the remainder of the waste matter by passing through the gaps in the drum; wherein said hot syngas contains substantially no oxygen.

2. The method according to claim 1 further comprising collecting the heat softened material within the apparatus in a collection pan beneath the rotating drum.

3. The method according to claim 1 further comprising providing a retention means within the drum and retaining the waste matter to be treated between the retention means and the interior of the rotating drum.

4. The method according to claim 1 wherein the hot gas is passed from an interior of the drum to an exterior of the drum through the waste matter.

5. The method according to claim 1 further comprising solidifying the material collected in the collection pan.

6. The method according to claim 1 further comprising the step of:
   once the heat softening material has been substantially separated from the remainder of the waste matter, increasing the temperature within the drum by passing hot gasses substantially devoid of oxygen through said chamber so as to pyrolyse any organic matter within the remaining waste matter.

7. The method of claim 6 further comprising the step of maintaining the separated heat softening material within the apparatus at a temperature below its pyrolysis temperature.

8. The method according to claim 1 wherein placing the waste matter in a rotating drum having gaps therein comprises:
   placing the waster matter in a waste processing cartridge comprising: said drum; a retaining means adjacent to and separated from the interior of the drum such that a space is defined between the retaining means and the drum for receiving the waste;
   a chamber liner surrounding and separated from the drum; and a collection pan removably attached to the chamber liner underneath the rotating drum; and
   placing the waste processing cartridge in said apparatus.

9. The method according to claim 8 further comprising the step of, after separating said heat softening material from said waste matter, removing said cartridge from said apparatus.

10. The method of claim 9 comprising:
    allowing the heat softening material to cool so as to solidify;
    separating the collection pan from the chamber liner; and
    removing the solidified heat softening material from the collection pan.

11. The method according to claim 1 wherein the waste matter comprises metal cables insulated with a polymer material and the method substantially separates the polymer material from the metal.

12. The method according to claim 1 wherein said apparatus has an inlet, a first outlet coaxial to the drum and located at one end thereof, and a second outlet in the side of said apparatus, the method further comprising:
    opening a flow path through said inlet and said second outlet for the passage of hot gas to clean said material therein;
    closing the flow path through said inlet and said second outlet and opening a flow path through said inlet and said first outlet to process said waste.

13. The method according to claim 12 wherein the method further comprises adding water and/or surfactants to said hot gas when the hot gasses are flowing through said flow path between said inlet and said second outlet.

14. The method according to claim 1 wherein said apparatus has an inlet, a first outlet coaxial to the drum and located at one end thereof, and a second outlet in the side of said apparatus, the method further comprising:
    passing said hot gasses through a flow path between the inlet and the first outlet to heat said heat softening material;
    after said heat softening material has been substantially separated from the remainder of said waste matter, closing said flow path between said inlet and said first outlet; opening a flow path between said inlet and said second outlet; and increasing the temperature within said apparatus by passing hot gasses substantially devoid of oxygen through said flow path between said inlet and said second outlet so as to pyrolyse any organic matter within the remaining waste matter.

15. The method according to claim 1 wherein the method further comprises providing a flow path between an outlet of the waste processing apparatus and the treatment chamber and passing said gasses exiting said waste processing apparatus into said treatment chamber.

16. An apparatus for processing waste matter containing heat softening material, the apparatus comprising:
    a pyrolysing apparatus for pyrolysing material containing organic matter, said pyrolysing apparatus comprising a heated chamber in which said material containing organic matter is heated to produce a syngas, and a treatment chamber connected to said heated chamber by feed and return conduits;

a waste processing apparatus comprising:
- a heat proof chamber having side walls, an inlet for receiving hot gas and a first outlet for exhausting hot gas;
- a rotatable drum for containing waste matter to be processed, said drum having gaps therein and being located within the heat proof chamber and separated therefrom around its edge by a gap;
- a means for rotating the drum at a speed such that, in use, waste matter that is heat softened is centrifugally separated from the remainder of the waste matter and passes through the gaps in the drum; and
- conduit means for passing at least some of said syngas through said waste processing apparatus to, in use, heat said waste matter therein.

17. The apparatus as claimed in claim 16 wherein the waste processing apparatus further comprises a retaining means, adjacent to and separated from the interior of the drum such that a space is defined between the retaining means and the drum for receiving the waste matter.

18. The apparatus according to claim 16 wherein the waste processing apparatus further comprises a chamber liner located adjacent the side walls of the heat proof chamber.

19. The apparatus according to claim 16 wherein the inlet comprises an inlet conduit centrally located within the drum, the inlet conduit having a plurality of outlet holes therein about its circumference.

20. The apparatus according to claim 16 wherein the waste processing apparatus further comprises a collection pan located at the lower end of the heat proof chamber for, in use, collecting the heat softened material separated from the waste matter.

21. The apparatus according to claim 20 wherein the collection pan is in the shape of an open topped annulus and wherein the outlet for exhausting hot gas passes through the center of the annulus.

22. The apparatus according to claim 16 wherein the means of rotating the drum comprises an electric motor located externally of the heat proof chamber and having a drive shaft passing through the heat proof container from the outside to the inside.

23. The apparatus according to claim 16 wherein the heat proof chamber has an opening along one side thereof for providing a second, alternative, outlet for the hot gas, the waste processing apparatus further comprising valve means for selectively opening a flow path through either the first outlet and/or through the second outlet.

24. The apparatus according to claim 16 wherein the waste processing apparatus further comprises:
- a retaining means, adjacent to and separated from the interior of the drum such that a space is defined between the retaining means and the drum for receiving the waste;
- a chamber liner located adjacent the side walls of the heat proof chamber; and
- a collection pan located at the lower end of the heat proof chamber for, in use, collecting the heat softened material separated from the waste matter, said collection pan removeably attached to said chamber liner;
- wherein the rotatable drum, the retaining means, the chamber liner and the collection pan form a waste processing cartridge, the waste processing cartridge removable from the heat proof chamber as a single unit.

* * * * *